United States Patent
Nagata

(10) Patent No.: US 7,366,497 B2
(45) Date of Patent: Apr. 29, 2008

(54) MOBILE TERMINAL, METHOD OF CONTROLLING THE SAME, AND COMPUTER PROGRAM OF THE SAME

(75) Inventor: Hideaki Nagata, Tokyo (JP)

(73) Assignee: NEC Corporation, Tokyo (JP)

( * ) Notice: Subject to any disclaimer, the term of this patent is extended or adjusted under 35 U.S.C. 154(b) by 143 days.

(21) Appl. No.: 10/995,136

(22) Filed: Nov. 24, 2004

(65) Prior Publication Data
US 2005/0113071 A1    May 26, 2005

(30) Foreign Application Priority Data
Nov. 25, 2003    (JP) .............................. 2003-394312

(51) Int. Cl.
*H04M 1/66*    (2006.01)
(52) U.S. Cl. ................... 455/410; 455/411; 455/550.1
(58) Field of Classification Search ............... 455/410, 455/411, 412.2, 413, 415
See application file for complete search history.

(56) References Cited

U.S. PATENT DOCUMENTS

| | | | | |
|---|---|---|---|---|
| 6,141,436 A * | 10/2000 | Srey et al. | ................... | 382/124 |
| 6,449,492 B1 * | 9/2002 | Kenagy et al. | .......... | 455/550.1 |
| 6,456,976 B1 * | 9/2002 | Kuita | .......................... | 704/273 |
| 2001/0009847 A1 * | 7/2001 | Kim et al. | ..................... | 455/90 |
| 2002/0077079 A1 * | 6/2002 | Ishihara | ....................... | 455/410 |
| 2002/0127996 A1 * | 9/2002 | Chiu | .......................... | 455/410 |
| 2003/0228883 A1 * | 12/2003 | Kusakari et al. | ......... | 455/550.1 |
| 2004/0092248 A1 * | 5/2004 | Kelkar et al. | ................ | 455/411 |

FOREIGN PATENT DOCUMENTS

| | | |
|---|---|---|
| CN | 1310567 A | 8/2001 |
| CN | 1402584 A | 3/2003 |
| EP | 1128641 A2 | 8/2001 |
| EP | 1 289 239 A2 | 3/2003 |
| EP | 1 339 253 A2 | 8/2003 |
| JP | 2002-077379 | 3/2002 |
| JP | 2002-368870 | 12/2002 |

* cited by examiner

*Primary Examiner*—Duc M. Nguyen
*Assistant Examiner*—Dai Phuong
(74) *Attorney, Agent, or Firm*—Young & Thompson

(57) ABSTRACT

A mobile telephone (1), when being folded, is set in a lock state by an opening/closing detection and lock mechanism (50), and then a control circuit (30) stops supply of an electric power to a fingerprint authentication unit (60). In this state, upon detection of an incoming call from an external apparatus, the control circuit (30) restarts the supply of the electric power to the fingerprint authentication unit (60), and when a user is authenticated as a legitimate user by the fingerprint authentication unit (60), instructs the opening/closing detection and lock mechanism (50) to carry out an unlocking operation.

13 Claims, 4 Drawing Sheets

MOBILE TERMINAL, METHOD OF CONTROLLING THE SAME, AND COMPUTER PROGRAM OF THE SAME

FIELD OF THE INVENTION

The present invention relates to a technical field of a mobile terminal such as a mobile telephone. In particular, the present invention relates to a technical field of a mobile telephone having a lock function.

BACKGROUND OF THE INVENTION

In recent years, various kinds of security products for preventing a main body of a personal computer (hereinafter referred to as "PC") from being stolen and for protecting data preserved in a PC have been on the market. As for such security products, for example, there are known:

- an authentication key for controlling log-in and log-out of a PC by being inserted in and removed from a universal serial bus (USB) port,
- a data encryption key for carrying out encryption and decryption in accordance with insertion and removal of the data encryption key in and out the USB port, and
- a PC card for detecting shocks and vibrations accompanying a movement of a PC with an acceleration sensor to judge whether or not the PC is stolen.

In mobile communication terminals such as a mobile telephone and mobile electronic apparatuses such as a personal digital assistant (PDA), during log-in and an access to important data, whether or not a user is a legitimate user is authenticated using a password (personal identification number). Those electronic apparatuses preserve therein important data such as personal information of a user similarly to the case of the PC. Thus, it is necessary to take measures against burglary of a main body of an electronic apparatus and shoulder hack of data.

From this viewpoint, a conventional mobile telephone has a function called a dial lock (keylock) for making a key input electronically invalid. However, recognition of the dial lock function (keylock function) to users is low. In addition, a series of manipulations for setting a dial lock state and for releasing a setting state in restarting use of the mobile telephone using this function are troublesome for a user. Thus, the number of users who usually utilize such a dial lock function is not so many. Moreover, the apparatus configuration for requiring a user to input a password (personal identification number) when the user accesses important data is troublesome for a legitimate user.

Then, in recent years, a folding mobile telephone including a mechanical lock mechanism and a fingerprint authentication unit has come onto the market. In this folding mobile telephone, when chassis are folded, the lock is automatically engaged in a state where the chassis are folded, and the chassis can not be returned back to an open state unless the lock state is released. Therefore, the folding mobile telephone can be prevented from being unlawfully used.

Now, in the mobile telephone for which the mobile property is regarded as important, since a battery (rechargeable battery) which is installed for the operation is also miniature, there is a limit to a power supply capacity. Thus, in general, the mobile telephone is required to reduce the power consumption during the operation as much as possible. Consequently, in the mobile telephone having the lock mechanism as described above, the supply of an electric power is desirably stopped for each functional portion which is inhibited from being used in the lock state.

However, the supply of the electric power to the fingerprint authentication unit used to release the lock state can not be stopped (turn-OFF of a power supply) even in the lock state because the fingerprint authentication for a legitimate user must be speedily carried out. On the other hand, in the case of the apparatus configuration adapted to stop the supply of the electric power to the fingerprint authentication unit in order to reduce the power consumption, there is required a mechanism for restarting the supply of the electric power (turn-ON of the power supply) to the fingerprint authentication unit by some means or other.

Then, JP2002-368870A proposes an apparatus configuration adapted to carry out fingerprint authentication when a user manipulates an authentication start key in order to release such a lock state.

However, in a case where an exclusive manipulation key for switching an operation state of a fingerprint authentication unit is provided in a mobile telephone, the construction of the mobile telephone becomes complicated. Also, in this case, the labor of a user for releasing the lock state is increased. In particular, the apparatus configuration adapted to force a user to carry out a plurality of manipulations under the situation where an incoming call sound of a mobile telephone is ringing is not preferable.

SUMMARY OF THE INVENTION

The present invention has been made in the light of the above-mentioned problems, and it is, therefore, an object of the present invention to provide a mobile terminal which includes a lock function (lock means: that is at least one of a mechanical lock mechanism and an electronic keylock mechanism) and an authentication unit, and which is capable of precisely supplying an electric power to the authentication unit to make the reduction of power consumption and the ensuring of security compatible with each other without increasing a burden imposed on a user in terms of manipulations.

In order to attain the above-mentioned object, the features of the mobile terminal according to the present invention are as follows.

That is, there is provided a mobile terminal provided with lock means and an authentication unit, in which any of manipulations for the mobile terminal are inhibited based on lock by the lock means and the lock means is unlocked to allow a manipulation for the mobile terminal in response to that a user is authenticated as a legitimate user by the authentication unit, the mobile terminal including:

control means (control circuit 30, CPU 101) for starting supply of an electric power to the authentication unit (fingerprint authentication unit 60) in response to an occurrence of a predetermined event in the mobile terminal (1) during the lock by the lock means (opening/closing detection and lock mechanism 50), and for unlocking the lock means when a user is authenticated as a legitimate user by the authentication unit.

Here, the predetermined event is, for example, at least one of an operation of an incoming call from an external apparatus to the mobile terminal, and an operation of report of preset schedule.

According to a preferred embodiment of the mobile terminal, the control means supplies the electric power to the authentication unit over a predetermined period of time in response to the occurrence of the predetermined event, and unlocks the lock means when the user is authenticated as a legitimate user within the predetermined period of time by the authentication unit.

In the above case, the control means may stop the supply of the electric power to the authentication unit when the authentication by the authentication unit is not carried out within the predetermined period of time.

In addition, preferably, the control means may inform a user that the electric power is supplied to the authentication unit by utilizing at least one of a sound, light, and a vibration.

Note that, the above-mentioned object can be attained by a method of controlling the mobile terminal having the configuration described above.

In addition, the above-mentioned object can be attained by a computer program for realizing the mobile terminal having the configuration described above and the method of controlling the mobile terminal using a computer, and by a computer readable storage medium having the computer program stored therein.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE
PREFERRED EMBODIMENTS

Preferred embodiments of the present invention will now be described in detail in accordance with the accompanying drawings.

The present invention will hereinafter be described in detail based on an embodiment applied to a mobile telephone as a typical mobile terminal with reference to the accompanying drawings.

Apparatus Configuration of Mobile Telephone 1

First of all, a hardware configuration of a mobile telephone 1 according to an embodiment of the present invention will hereinafter be described with reference to FIGS. 1, 3, and 4A and 4B.

Figure 1:
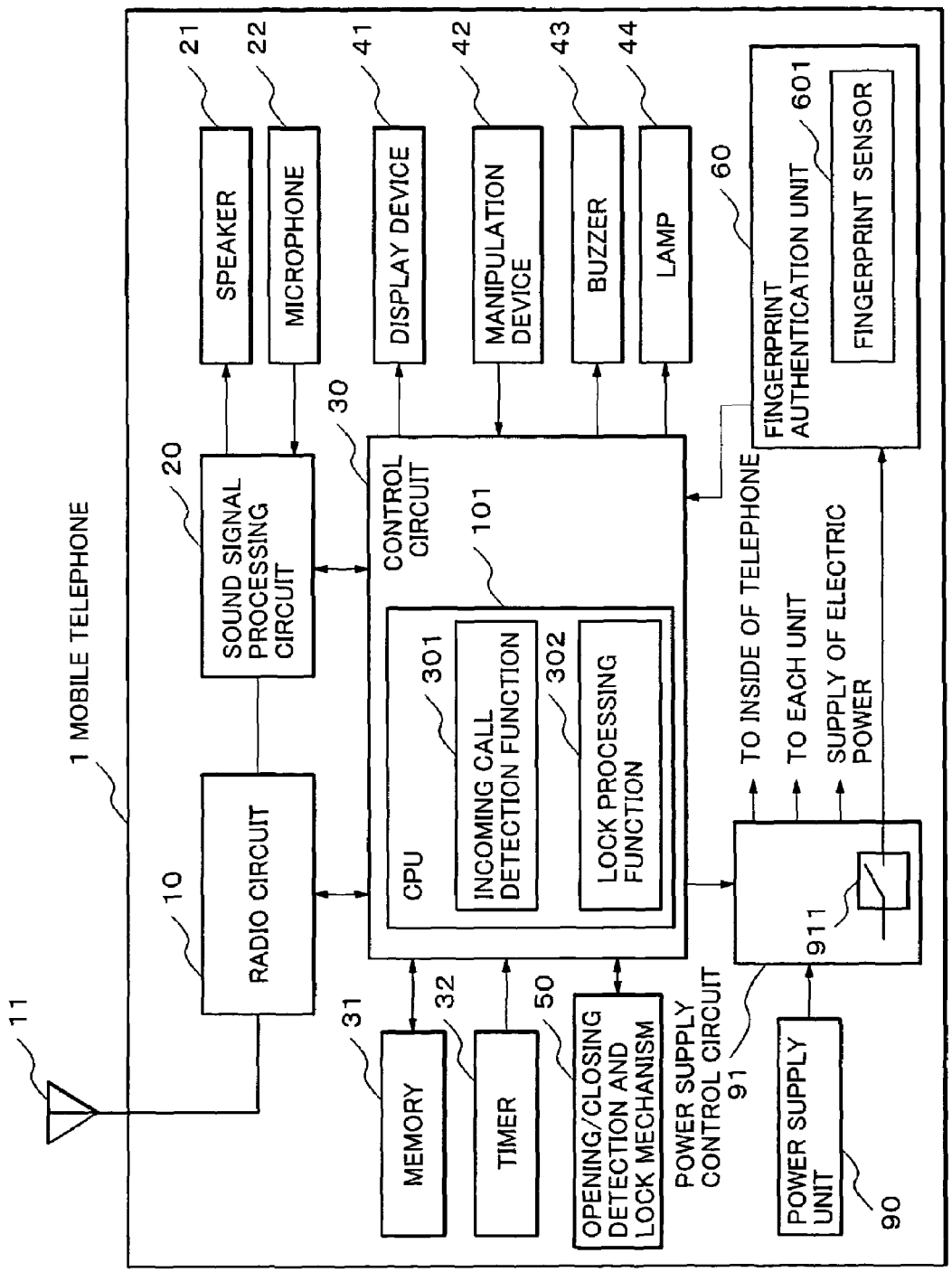
FIG. 1 is a block diagram showing a configuration of a mobile telephone according to an embodiment of the present invention.

FIG. 1 is a block diagram showing a configuration of a mobile telephone according to an embodiment of the present invention. The mobile telephone (folding mobile telephone) 1 according to this embodiment, as shown in FIG. 1, includes a radio circuit 10, an antenna 11, a sound signal processing unit 20, a speaker 21, a microphone 22, a control unit 30, a memory 31, a timer 32, a display device 41, a manipulation device 42, a buzzer 43, a lamp 44, an opening/closing detection and lock mechanism 50, a fingerprint authentication unit 60, a power supply unit 90, and a power source control unit 91.

More specifically, in a state where the mobile telephone 1 is wirelessly connected to an external base station through the antenna 11 in accordance with an instruction issued from the control circuit 30, the radio circuit 10 carries out a voice communication or a data communication with an external apparatus.

The sound signal processing circuit 20 is connected to the radio circuit 10 and serves to process a transmission sound signal and a reception sound signal during the voice communication with an external apparatus in accordance with an instruction issued from the control circuit 30. Then, the speaker 21 outputs the reception sound signal in the form of a voice (sound). A voice which becomes a source of such a transmission sound signal is inputted to the microphone 22 by a user.

The memory 31 is a nonvolatile storage device, and serves to store therein a software program to be executed by a central processing unit (CPU) 101 of the control circuit 30, various kinds of parameters, and user data such as telephone numbers and e-mails.

The timer 32 executes a time processing in accordance with an instruction issued from the control circuit 30. Then, the timer 32 informs the control circuit 30 of the termination of timing (time-out) for a predetermined period of time.

The display device 41 includes a display unit such as a liquid crystal display unit for visually displaying thereon characters, numerical characters, and graphic forms. Thus, the display device 41 displays thereon information which is received from an external apparatus through the radio circuit 10, and information corresponding to characters and numerical characters which a user inputs by manipulating the manipulation device 42 in accordance with the control made by the control circuit 30.

The manipulation device 42 includes a plurality of input switches (including keys and buttons) such as a ten key, and a pointing device capable of moving a cursor in an arbitrary direction. Thus, the manipulation device 42 is used to input a manipulation instruction from a user.

The buzzer 43 generates a ringing tone to inform a user of a predetermined state in accordance with the, control made by the control circuit 30.

The lamp (lamp group) 44 includes a plurality of light emission devices such as light emitting diodes (LEDs). Thus, the lamp 44 emits light to inform a user of a predetermined state in accordance with the control made by the control circuit 30.

The opening/closing detection and lock mechanism 50 detects an open/close state (folded state) of the chassis of the mobile telephone 1 and informs the control circuit 30 of the detection results. Moreover, the opening/closing detection and lock mechanism 50 locks and unlocks the user's manipulation for physically opening/closing the folding chassis in accordance with the control by the control circuit 30. Consequently, the lock function of the opening/closing detection and lock mechanism 50 includes a mechanical lock mechanism adapted to operate in accordance with the control by the control circuit 30.

The fingerprint authentication unit 60 includes a fingerprint sensor 601 for reading a fingerprint of a human being.

The fingerprint authentication unit 60 compares a newly read fingerprint (fingerprint data) with a legitimate user's fingerprint (fingerprint data) which is registered in advance, thereby authenticating whether or not a user is a legitimate user.

That is, a fingerprint (fingerprint data: in this case, fingerprint data of a plurality of fingers is desirable) of a legitimate user is registered in the fingerprint authentication unit 60 in advance. The registration of a fingerprint, for example, is carried out as follows. A user manipulates a suitably allocated switch of the manipulation device 42, thereby requesting the control circuit 30 to register fingerprint data of the user.

In this embodiment, in order to reduce the power consumption of the overall mobile telephone 1, no electric power is supplied to the fingerprint authentication unit 60 except for a case of a predetermined operation state. Whether or not the electric power supply is performed is controlled by a switch 911. The control unit 30 controls a power supply control circuit 91, thereby supplying an electric power from the power supply circuit 90 to the fingerprint authentication unit 60. The fingerprint authentication unit 60 suitably registers the data (fingerprint data) representing a fingerprint which has been read with the fingerprint sensor 601 in a memory.

Note that the fingerprint data of a legitimate user may be stored in a memory built in the fingerprint authentication unit 60, or may be stored in an external memory such as the memory 31.

The power supply unit 90 has a rechargeable battery (not shown) and serves to supply an electric power to each unit provided within the mobile telephone 1.

The power supply control circuit 91 includes a plurality of switches (switching elements) for controlling the supply of an electric power to each unit within the mobile telephone 1. In this embodiment, such switches are operated in correspondence to various kinds of modes such as an incoming call wait mode in accordance with the control by the control circuit 30. In particular, the switch 911 is turned ON or OFF to control the supply of the electric power from the power supply unit 90 to the fingerprint authentication unit 60.

The control circuit 30 includes the CPU 101 for managing the overall operation of the mobile telephone land other hardware (not shown) and various kinds of software programs to be executed by the CPU 101.

The control circuit 30 operates in accordance with the software programs stored in the memory 31 in advance, thereby controlling the operations of the units within the mobile telephone 1. As the software programs directly related to this embodiment, as shown in FIG. 1, there are an incoming call detection function 301 and a lock processing function 302. The incoming call detection function 301 is a program for analyzing a signal received at the radio circuit 10 and for detecting an incoming call of a voice communication or an incoming call of an e-mail. The lock processing function 302 is a program for controlling the lock setting and the lock release made by the opening/closing detection and lock mechanism 50.

Note that the memory 31, the timer 32, the sound signal processing circuit 20, the power supply control circuit 91, and the like may be suitably mounted in a state of being included in the control circuit 30 for convenience of a design.

In addition, at the present time, a general technique can be adopted for the operations themselves for the data transmission/reception processing, the sound processing, and the like which are executed between an external apparatus and the mobile telephone 1 with the above-mentioned apparatus configuration. Hence, its detailed description is omitted in this embodiment.

Figure 3:
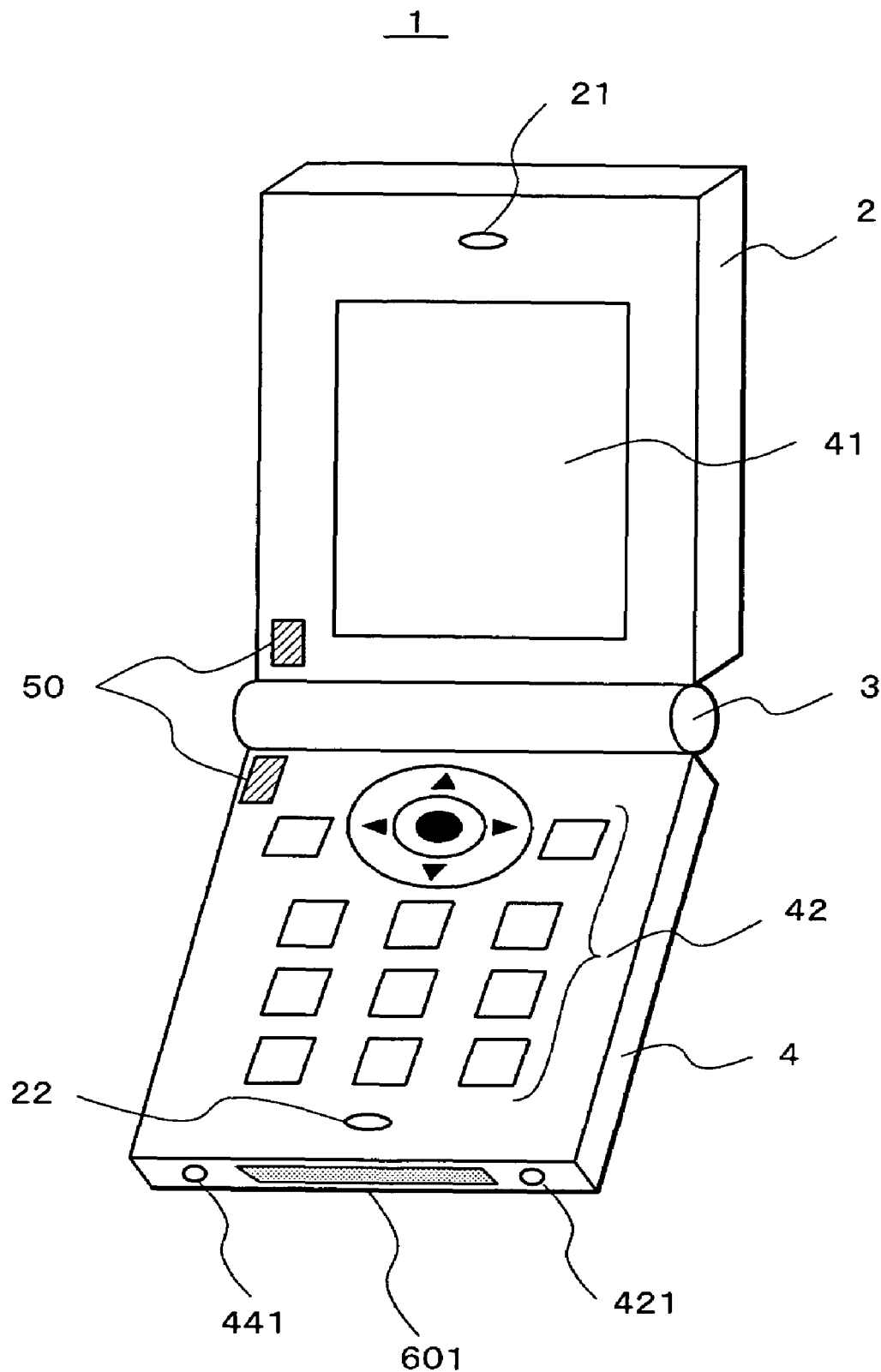
FIG. 3 is a perspective view exemplifying an external construction of the mobile telephone according to the embodiment of the present invention.
Figure 4:
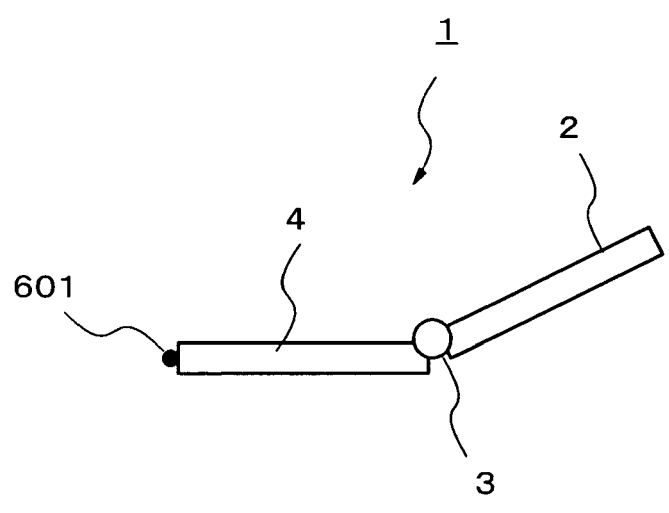
FIG. 4A is a side elevational view showing a state where the mobile telephone according to the embodiment of the present invention is opened.
FIG. 4B is a side elevational view showing a state where the mobile telephone according to the embodiment of the present invention is folded (in a close state).
Figure 4:
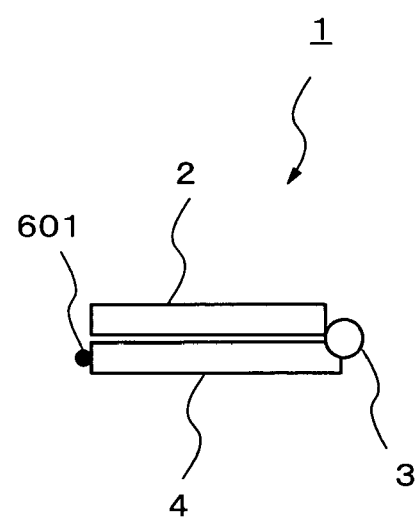

FIG. 3 is a perspective view showing an external construction example of the mobile telephone 1 according to this embodiment of the present invention. FIG. 4A is a side elevational view showing an open state of the mobile telephone 1 according to this embodiment of the present invention. FIG. 4B is a side elevational view showing a folded state (close state) of the mobile telephone 1 according to this embodiment of the present invention.

The mobile telephone 1 according to this embodiment has a folding construction in which as shown in FIG. 3, an upper side chassis 2 and a lower side chassis 4 are coupled to each other through a hinge 3 so as to be opened and closed. With such a folding construction, the mobile telephone 1 can adopt a close state where the upper side chassis 2 and the lower side chassis 4 are closed (refer to FIG. 4B) and an open state where the upper side chassis 2 and the lower side chassis 4 are opened (refer to FIG. 4A) in correspondence to the manipulation made by a user.

The upper side chassis 2 and the lower side chassis 4 are provided with the opening/closing detection and lock mechanism 50 in positions which face each other in the close state. The opening/closing detection and lock mechanism 50 detects whether the upper side chassis 2 and the lower side chassis 4 are in the open state (refer to FIG. 4A) or in the close state (refer to FIG. 4B). Moreover, the opening/closing detection and lock mechanism 50 mechanically locks the upper side chassis 2 and the lower side chassis 4 in correspondence to the detection of such a close state, thereby regulating the upper side chassis 2 and the lower side chassis 4 so that a user can not open the upper side chassis 2 and the lower side chassis 4 unless the opening/closing detection and lock mechanism 50 is unlocked after the lock. Here, such an unlocking operation is carried out in accordance with the control by the control circuit 30 only when the authentication results from the fingerprint authentication unit 60 show that a user is a legitimate user (its details will be described later).

Note that, in this embodiment, the description has been given by giving as an example the specific case where an opening/closing detection mechanism and a lock mechanism are integrated into the opening/closing detection and lock mechanism 50. However, the present invention is not intended to be limited to this specific case. That is, there may be adopted such a construction that the opening/closing detection mechanism and the lock mechanism are separately provided in the mobile telephone 1. In addition, since the well known technique can be suitably adopted for the opening/closing detection mechanism and the lock mechanism, its detailed description is omitted in this embodiment.

The upper side chassis 2 is provided with the speaker 21 and the display device (display unit) 41 on its inside face (in a position which is hidden in the close state).

The lower side chassis 4 is provided with the microphone 22 and the manipulation device 42 on its inside face. In addition, the fingerprint sensor 601 of the fingerprint authentication 60, a lamp 441, and a switch 421 are provided in a side surface of the lower side chassis 4 (in a position which is not hidden even in the close state). The lamp 441 is one of the lamps 44 described above, and serves to inform a user that the fingerprint authentication unit 60 is kept charged with electricity. The switch 421 is a switch for, when the introduction of an electric current to the fingerprint authentication unit 60 is stopped, charging the fingerprint authentication unit 60 with electricity in accordance with the manipulation made by a user. That is, upon detection of a turn-ON state (close state) of the switch 421, the control circuit 30 changes an operation state of the switch 911 over to the close state (turn-ON state). As a result, the supply of the electric power to the fingerprint authentication unit 60 is restarted, thereby activating the fingerprint authentication unit 60.

Note that in this embodiment, the layout in which the fingerprint sensor 601, the lamp 441, and the switch 421 are provided in the position shown in FIG. 3 (in the side surface of the bottom end of the lower side chassis 4) is adopted as an example. However, the present invention is not intended to be limited to such a layout. Those devices may be provided in any of positions as long as the position is exposed to the outside in the folded state of the upper side chassis 2 and the lower side chassis 4.

Operation Control for Mobile Telephone 1

Next, a description will be given to characteristic operation control for the mobile telephone 1 having the apparatus configuration described above with respect to FIG. 2. In the following description, as an event which is to be detected for release of the lock state, a case where an incoming call originated from an external apparatus to the mobile telephone 1 is given as an example for convenience of the description.

Figure 2:
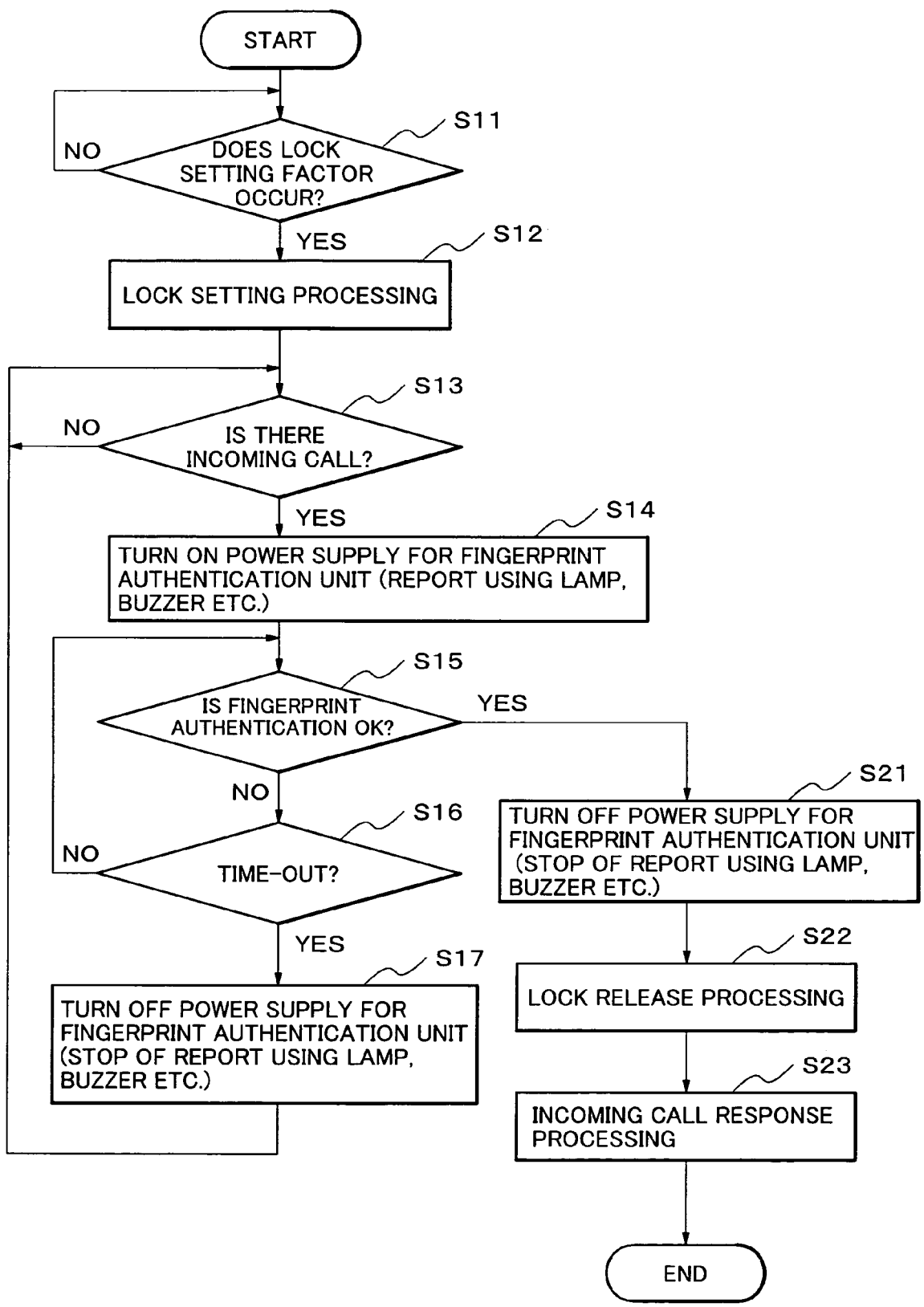
FIG. 2 is a flow chart showing a control processing executed in the mobile telephone according to the embodiment shown in FIG. 1.

FIG. 2 is a flowchart showing a control processing executed in the mobile telephone 1 according to this embodiment. This flow chart represents the processing procedure of the software program which the CPU 101 executes in the control circuit 30 shown in FIG. 1. The CPU 101 starts this control processing upon turn-ON of a power supply switch (not shown) of the mobile telephone 1 through the manipulation by a user.

First of all, it is supposed that the mobile telephone 1 is in the open state where the upper side chassis 2 and the lower side chassis 4 are in the open state (refer to FIG. 4A), and the opening/closing detection and lock mechanism 50 is in the unlocked state. It is also supposed that in this state, a user can utilize all the functions of the mobile telephone 1. Under this condition, it is unnecessary to carry out the fingerprint authentication. To reduce the power consumption, the CPU 101 turns OFF the switch 911, thereby stopping the supply of the electric power to the fingerprint authentication 60.

The CPU 101 (the lock processing function 302) judges whether or not the upper side chassis 2 and the lower side chassis 4 are in the close state (refer to FIG. 4B) through the opening/closing detection and lock mechanism 50 (Step S11).

In the open state (refer to FIG. 4A), a user can carry out an operation for closing the upper side chassis 2 and the lower side chassis 4. When the CPU 101 detects the close state based on the judgment in Step S11, the CPU can judge that a close state setting factor occurs. Then, the CPU 101 instructs the opening/closing detection and lock mechanism 50 to carry out the lock operation (Step S12). As a result, the upper side chassis 2 and the lower side chassis 4 are locked while the close state is held (refer to FIG. 4B).

Note that, in the above-mentioned example, there is adopted such a constitution that the CPU 101, upon detection of the close state, instructs the opening/closing detection and lock mechanism 50 to carry out the lock operation. However, the present invention is not intended to be limited to this constitution as long as the opening/closing detection and lock mechanism 50 can inform the CPU 101 of such a close state. For example, a mechanism for making mechanically transition to the lock state by utilizing the operation when the upper side chassis 2 and the lower side chassis 4 are closed through the manipulation by a user can also be adopted for the lock mechanism which the opening/closing detection and lock mechanism 50 has. However, such a mechanical lock mechanism must be able to make the transition to the unlocked state when the CPU 101 issues thereto an operation instruction.

When in the mobile telephone 1 in the close state (refer to FIG. 4B), the opening/closing detection and lock mechanism 50 is in the lock state, a user can not carry out the input manipulation for the manipulation device 42, and the visual observation for the display device 41. Consequently, even when the mobile telephone 1 is stolen, and so forth, the unlawful use and the outflow of the user data can be prevented, and hence the security can be ensured.

In addition, in the close state, the CPU 101 (the lock processing function 302) allows the radio circuit 10 to make the transition from the current operation mode to the wait mode. Then, in the wait mode, in order to reduce the power consumption, the CPU 101 controls the power supply control circuit 91 so that the supply of the electric power to each unit of the mobile telephone 1 is limited to only the necessary units.

Next, a description will be given to a case where a predetermined event occurs when the mobile telephone 1 is in the above-mentioned states (i.e., in the close state and the lock state). In this example, it is supposed that such an event corresponds to an incoming call operation for the voice communication (sound incoming call) and an incoming call for the data communication (packet communication) (e.g., an incoming call of an e-mail).

That is, when the mobile telephone 1 is in the close state and the lock state as described above, the CPU 101 (the incoming call detection function 301) of the control circuit 30 waits for an incoming call from an external apparatus (Step S13). When the CPU 101 detects an incoming call in Step S13, the CPU 101 informs the lock processing function 302 that the incoming call has arrived at the mobile telephone 1.

When the lock processing function 302 is informed that the incoming call has arrived at the mobile telephone 1 in the state where the mobile telephone 1 is in the close state and the lock state, the CPU 101 (the lock processing function 302) starts the lock release processing based on the fingerprint authentication (Step S14). That is, in Step S14, the CPU 101 controls the power supply control circuit 91 (the switch 911), thereby starting the supply of the electric power to the fingerprint authentication unit 60. As a result, the fingerprint authentication unit 60 is activated. Moreover, in Step S14, the CPU 101 activates the timer 32 so that the timer starts to time a predetermined period of time as an allowable time required for the fingerprint authentication.

In addition, in Step S14, the CPU 101 (the lock processing function 302) turns ON (or turns ON and OFF) the lamp 441 (the ringing of the buzzer 43, or the vibration operation by a vibrator (not shown) may also be available), thereby requiring a user to accept the fingerprint authentication.

Upon turn-ON of the power supply unit 90, the fingerprint authentication unit 60 reads a fingerprint of a user with the fingerprint sensor 601, and then compares the data of the fingerprint thus read with the legitimate user's fingerprint data which is registered in advance. When the comparison results show that both the data of the fingerprint thus read and the legitimate user's fingerprint data agree with each other, the fingerprint authentication unit 60 informs the CPU 101 (the lock processing function 302) that the fingerprint of the user is authenticated.

When the CPU 101 (the lock processing function 302) is informed that the fingerprint of the user is authenticated as the fingerprint of a legitimate user (the authentication is OK) from the fingerprint authentication unit 60 before the timer 32 terminates the timing of the predetermined period of time (time-out), the CPU 101 makes the operation to proceed to a processing in Step S21.

That is, first of all, the CPU 101 (the lock processing function 302) controls the power supply control unit 91 to stop the supply of the electric power to the fingerprint authentication unit 60 and also to turn OFF the lamp 441 (including the stop of the buzzer 43 in ringing, and the stop of the vibrator (not shown) in vibration operation) (Step S21).

Subsequently, the CPU 101 (the lock processing function 302) instructs the opening/closing detection and lock mechanism 50 to unlock the upper side chassis 2 and the lower side chassis. 4 (Step S22). As a result, in the mobile telephone 1, the upper side chassis 2 and the lower side chassis 4 can be opened through the manipulation by the user (or automatically) (refer to FIG. 4A).

Then, the CPU 101, upon detection of the open state through the opening/closing detection and lock mechanism 50, releases the wait mode until that time, and controls the power supply control circuit 91 to restart the supply of the electric power to each unit for which the supply of the electric power is stopped until that time (Step S23). As a result, the user can carry out the input manipulation for the manipulation device 42, the response to the incoming call of a voice communication, the verification of an incoming call of an e-mail, and the like while verifying the display contents on the display device 41.

On the other hand, when a predetermined period of time has elapsed without reception of the report representing that the fingerprint of a user is authenticated, the CPU 101 (the lock processing function 302) controls the power supply control circuit 91 to stop the supply of the electric power to the fingerprint authentication unit 60 and to turn OFF the light 441 (including the stop of the buzzer 43 in ringing, and the stop of the vibrator (not shown) in the vibration operation) (Step S17). That is, in this case, the upper side chassis 2 and the lower side chassis 4 in the close state are held in the lock state. Then, the CPU 101 (the lock processing function 302) returns the operation back to the processing in Step S13 to wait for a new incoming call.

Here, a description will hereinafter be given to a constitution of the software program constituting the lock processing function 302.

The lock processing function 302, as described above, is realized by the control based on the software program executed by the CPU 101. The lock processing function 302 is constituted by the following programs:

a chassis opening/closing detection function 3021,
a lock function 3022,
a lock release event detection function 3023,
a lock judgment function 3024,
an authentication start function 3025,
an authentication wait function 3026,
an authentication result judgment function 3027, and
a lock release function 3028.

Then, an operation of the lock processing function 302 will now be described on the ground of those functions.

In the close state of the upper side chassis 2 and the lower side chassis 4 (refer to FIG. 4B), upon the detection of the close state based on the report from the opening/closing detection and lock mechanism 50, the chassis opening/closing detection function 3021 calls the lock function 3022. Then, the lock function 3022 instructs the opening/closing detection and lock mechanism 50 to lock the upper side chassis 2 and the lower side chassis 4.

Upon the detection of an incoming call based on the report from the incoming call detection function 301, the lock release event detection function 3023 calls the lock judgment function 3024. The lock judgment function 3024, when judging that the upper side chassis 2 and the lower side chassis 4 are in the close state (refer to FIG. 4B) and the lock state, calls the authentication start function 3025.

The authentication start function 3025 issues an instruction to turn ON the power supply unit 90 for the fingerprint authentication unit 60 and to start the fingerprint authentication. Moreover, the authentication start function 3025, as may be necessary in correspondence to the apparatus configuration, transfers the fingerprint data of a legitimate user to the fingerprint authentication unit 60. Then, the authentication start function 3025 calls the authentication wait function 3026.

The authentication wait function 3026 instructs the timer 32 to start the timing, of a predetermined period of time, and waits for completion of the fingerprint authentication in the fingerprint authentication unit 60. Then, the authentication wait function 3026, at a time point of completion of the fingerprint authentication in the fingerprint authentication unit 60, calls the authentication result judgment function 3027. When a user does not touch the fingerprint sensor 601 with his/her finger for the predetermined period of time, the fingerprint authentication processing is terminated (time-out) Thus, no call is made for the authentication result judgment function 3027.

A case where the authentication wait function 3026 calls the authentication result judgment function 3027 means that the results of the authentication by the fingerprint authentication unit 60 show that a user is allowed to use the mobile telephone 1 (OK). Then, the authentication result judgment function 3027 calls the lock release function 3028. The lock release function 3028 instructs the opening/closing detection and lock mechanism 50 to unlock the upper side chassis 2 and the lower side chassis 4. This operation results in that the user can open the upper side chassis 2 and the lower side chassis 4 (refer to FIG. 4A) which are in the close state until that time.

Note that, in this embodiment described above, an incoming call of a voice communication and an incoming call of an e-mail are detected in Step S13 as the predetermined event for release of the lock state. However, the event to be detected is not intended to be limited to those operations. For example, an operation for reporting an alarm using a voice or the like on the date and time (schedule) set in advance may be detected as the predetermined event. That is, some mobile terminals such as a mobile telephone and a PDA are provided with a schedule management function for, in response to arrival of the desired date and time (schedule) set in advance by a user, informing a user of this effect using an alarm sound and displaying the details of the schedule set in advance on a screen. Then, the timing at which a user is informed of the arrival of the desired date and time set in advance in such a schedule management function may be detected as the predetermined event in Step S13.

In addition, the manipulation for the switch 421 provided on side surface of the bottom end of the lower side chassis 4 shown in FIG. 3 can be handled as an event for release of the lock state. In this case, the incoming call detection function 301 to be executed in the CPU 101 has to carry out not only the judgment of the presence or absence of an incoming call, but also the judgment of the presence or absence of the manipulation for the switch 421 in Step S13.

Of course, the switch 421 may not be provided. In this case, if the opening/closing detection and lock mechanism 50 is locked once in the close state of the upper side chassis 2 and the lower side chassis 4, then the lock state is released only when there is an incoming call. Thus, the optimal configuration can be obtained in terms of a mobile telephone which is given to a user (e.g., a child) for whom an unnecessary originating call is not wanted to be allowed.

Effects of Embodiment

According to this embodiment described above, when the mobile telephone 1 is in the close state and the lock state, the supply of the electric power to the fingerprint authentication unit 60 is stopped, while upon detection of an incoming call, the supply of the electric power to the fingerprint authentication unit 60 is restarted. At this time, when a user is authenticated as a legitimate user within a predetermined period of time, the control circuit 30 instructs the opening/closing detection and lock mechanism 50 to unlock the upper side chassis 2 and the lower side chassis 4. As a result, a user can open the upper side chassis 2 and the lower side chassis 4 of the mobile telephone 1 to carry out the manipulation for a response to an incoming call and the like.

Consequently, according to this embodiment, in the mobile telephone 1 including the opening/closing detection and lock mechanism 50 and the fingerprint authentication unit 60, the supply of the electric power to the fingerprint authentication unit 60 is precisely carried out, whereby it is possible to make the reduction of the power consumption and the ensuring of the security compatible with each other without increasing a burden imposed on a user in terms of the manipulation operations.

In this embodiment as described above, the mobile telephone to which the present invention can be applied has been described by giving an example the folding mobile telephone 1. However, the present invention is not intended to be limited in scope to this example. For example, the present invention can also be applied to an information processing apparatus such as a folding PDA or a notebook PC.

In addition, in this embodiment as described above, the principal (legitimate user) authentication unit has been described by giving as an example the fingerprint authentication unit 60 for carrying out the authentication using a fingerprint of a user. However, the present invention is not intended to be limited in scope to this example. For example, there may be adopted various kinds of authentication units such as an authentication unit utilizing a pattern of the blood stream in a finger of a user, and an authentication unit utilizing a pattern of the iris or the retina.

In addition, in this embodiment as described above, the opening/closing operation of the upper side chassis 2 and the lower side chassis 4 is regulated by the mechanical mechanism provided in the opening/closing detection and lock mechanism 50. However, electronic regulation means (keylock function) for disabling any of the manipulations for the apparatus in accordance with the manipulation of a specific switch (key) may also be adopted as the lock function to be installed in the apparatus instead of such a mechanical mechanism. In this case, the present invention can be widely applied to the electronic apparatuses (a mobile telephone or an information processing apparatuses such as a PDA and a notebook PC) each of which is not of the folding type. However, the present invention is aimed to reduce the power consumption of the electronic apparatus in which a miniature battery (rechargeable battery) having a limited power supply capacity is installed without impairing the usability for a user. Consequently, when the present invention is applied to a mobile electronic apparatus (i.e., a mobile terminal) in which a chassis is limited in size, the more preferable effects can be offered.

That is, according to this embodiment, in the mobile terminal including the lock function (i.e., the mechanical lock mechanism or the electronic keylock function) and the authentication unit, the supply of the electric power to the fingerprint authentication unit 60 is precisely carried out, whereby it is possible to reduce the power consumption as well as ensure the security without increasing a burden imposed on a user in terms of the manipulation operations.

Note that, after the computer program with which the functions (the incoming call detection function 301, the lock processing function 302, and the like) of the flow chart (refer to FIG. 2) referred to in the description of the mobile telephone 1 can be realized is supplied to the mobile telephone 1, the computer program is written to the CPU 101 of the mobile telephone to be executed, thereby implementing the present invention which has been described based on the above-mentioned embodiment.

In addition, in the above-mentioned case, as for the method of supplying the computer program to each of the apparatuses, at the present time, the general procedure can be adopted as typified by a method of installing a computer program in an apparatus in the manufacturing stage before the shipment, the maintenance stage after the shipment, or the like by utilizing a suitable jig, a method of downloading a computer program from the outside into an apparatus through a communication line such as the Internet, or the like. Then, in such a case, the present invention is constituted by a code or a storage medium of the computer program.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A mobile terminal provided with lock function and an authentication unit, in which manipulation of the mobile terminal is inhibited when the lock function is locked and the lock function is unlocked to allow a manipulation of the mobile terminal when a user is authenticated as a legitimate user by the authentication unit, the mobile terminal comprising:

a control circuit which starts supply of an electric power to the authentication unit only in response to an incoming call when the lock function is locked and unlocks the lock function when a user is authenticated as a legitimate user by the authentication unit, wherein said control circuit supplies the electric power to the authentication unit over a predetermined period of time only in response to the incoming call, unlocks the lock function when the user is authenticated as a legitimate user within the predetermined period of time by the authentication unit, and stops the supply of the electric power to the authentication unit when the authentication by the authentication unit is not carried out within the predetermined period of time.

2. The mobile terminal according to claim 1, wherein said control circuit informs the user that the electric power is supplied to the authentication unit by utilizing at least one of a sound, light, and a vibration.

3. The mobile terminal according to claim 1, wherein the authentication unit is a fingerprint authentication unit for carrying out user authentication based on results of comparison of information representing a fingerprint which is newly read during the supply of the electric power with fingerprint information of the legitimate user which is registered in advance.

4. The mobile terminal according to claim 1, wherein the lock function includes a mechanical lock mechanism which regulates an opening/closing manipulation by a user for a plurality of chassis constituting a main body of the mobile terminal.

5. The mobile terminal according to claim 1, wherein the lock function electronically regulates an input manipulation for the mobile terminal by a user.

6. The mobile terminal according to claim 1, further comprising detection means for detecting the incoming call from an external apparatus.

7. A mobile terminal comprising:
   lock means for locking and unlocking the mobile terminal;
   an authentication unit, wherein manipulation of the mobile terminal is inhibited when the lock means is locked and the lock means is unlocked to allow manipulation of the mobile terminal when a user is authenticated as a legitimate user by the authentication unit; and
   control means for starting supply of an electric power to the authentication unit only in response to an incoming call when the lock means is locked and for unlocking the lock means when a user is authenticated as a legitimate user by the authentication unit.

8. The mobile terminal according to claim 7, further comprising detection means for detecting the incoming call from an external apparatus.

9. A mobile terminal, comprising:
   authentication means for authenticating whether a user is a legitimate user of the mobile terminal;
   lock means for inhibiting and allowing manipulation of the mobile terminal;
   lock control means for inhibiting manipulation of the mobile terminal by said lock means and for unlocking said lock means to allow manipulation of the mobile terminal when a user is authenticated as a legitimate user by said authentication means;
   detection means for detecting an incoming wireless call from an external apparatus; and
   a power supply control unit which starts supply of an electric power to said authentication means only in response to detection of an incoming wireless call by said detection means when said lock means is locked.

10. A method of controlling a mobile terminal provided with lock function and an authentication unit, in which manipulation of the mobile terminal is inhibited when the lock function is locked and the lock function is unlocked to allow manipulation of the mobile terminal when a user is authenticated as a legitimate user by the authentication unit, the method comprising the steps of:
    supplying electric power to the authentication unit for a predetermined period of time only in response to an incoming call when the lock function is locked;
    unlocking the lock function when a user is authenticated as a legitimate user by the authentication unit within the predetermined period of time,
    stopping the supply of the electric power to the authentication unit when the authentication by the authentication unit is not carried out within the predetermined period of time.

11. The method according to claim 10, further comprising the step of the mobile terminal detecting the incoming call from an external apparatus.

12. A computer readable medium encoded with a computer program for operation control for a mobile terminal provided with a lock function and an authentication unit, in which manipulation of the mobile terminal is inhibited when the lock function is locked and the lock function is unlocked to allow manipulation of the mobile terminal when a user is authenticated as a legitimate user by the authentication unit, the computer program causing a computer to implement the steps of:
    supplying electric power to the authentication unit for a predetermined period of time only in response to an incoming call when the lock function is locked,
    unlocking the lock function when a user is authenticated as a legitimate user by the authentication unit within the predetermined period of time,
    stopping the supply of the electric power to the authentication unit when the authentication by the authentication unit is not carried out within the predetermined period of time.

13. The computer readable medium according to claim 12, wherein the computer program further implements the step of the mobile terminal detecting the incoming call from an external apparatus.

* * * * *